UNITED STATES PATENT OFFICE.

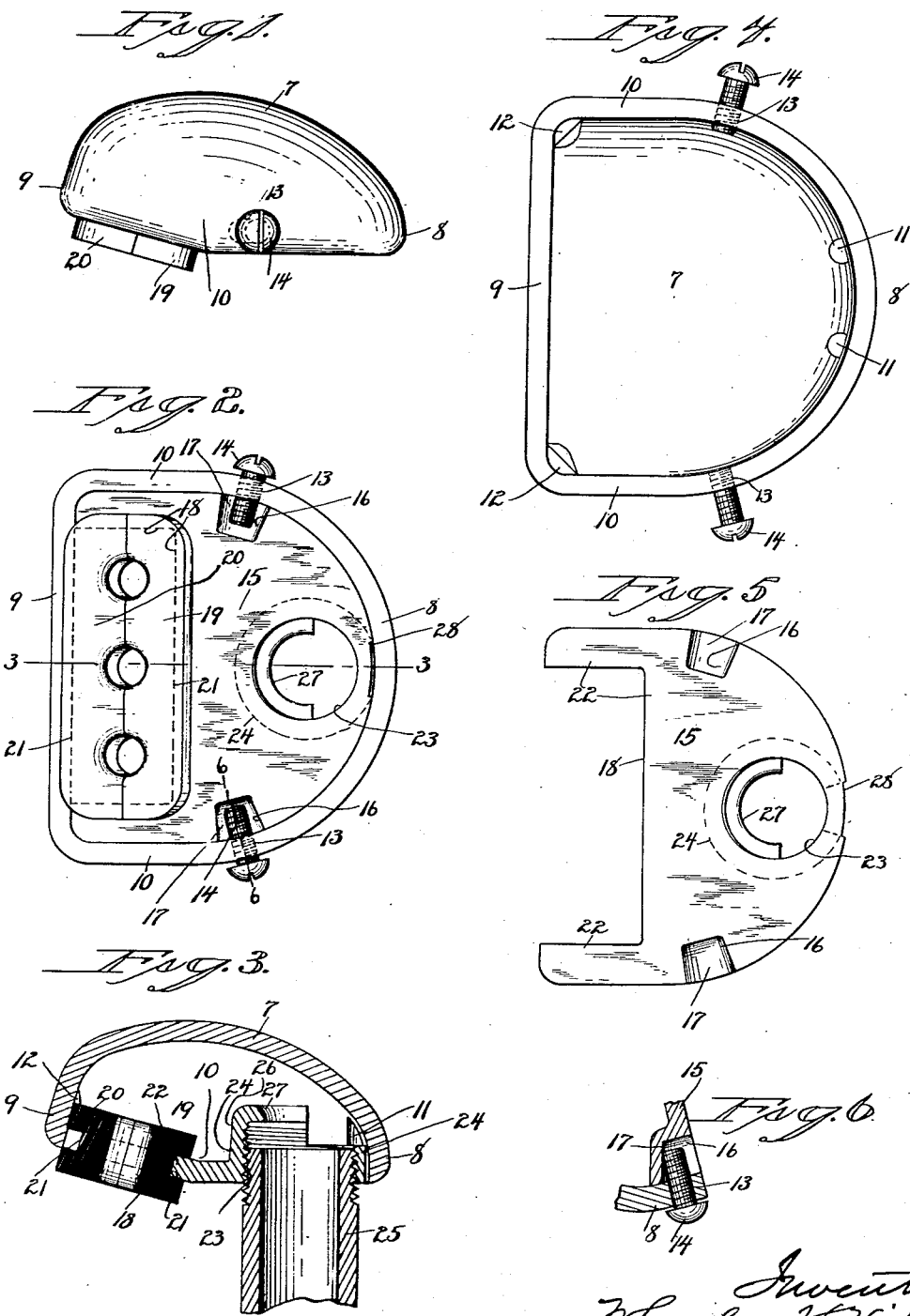

WHEELER H. VIBBER, OF NEW LONDON, CONNECTICUT, ASSIGNOR OF ONE-HALF TO THE GILLETTE-VIBBER CO., OF NEW LONDON, CONNECTICUT, A CORPORATION.

CONDUIT-CAP FOR ELECTRIC INSTALLATION.

1,266,887.   Specification of Letters Patent.   Patented May 21, 1918.

Application filed November 28, 1916. Serial No. 133,860.

*To all whom it may concern:*

Be it known that I, WHEELER H. VIBBER, a citizen of the United States, residing at New London, in the county of New London and State of Connecticut, have invented a new and useful Improvement in Conduit-Caps for Electric Installation; and I do hereby declare the following, when taken in connection with the accompanying drawings and the characters of reference marked thereon, to be a full, clear, and exact description of the same, and which said drawings constitute part of this application, and represent in—

Figure 1 a view in side elevation of my improved conduit-cap for electric installation.

Fig. 2 a reverse plan view thereof.

Fig. 3 a view thereof in vertical section on the line 3—3 of Fig. 2.

Fig. 4 a detached reverse plan view of the cover of the device.

Fig. 5 a corresponding view of the frame-piece of the device.

Fig. 6 a detail sectional view on the line 6—6 of Fig. 2.

My invention relates to an improved conduit-cap for use as an end-terminal for electric installation, the object being to provide an effective cap, constructed with particular reference to simplicity and durability of construction, and to convenience of installation and subsequent attention, if necessary.

With these ends in view, my invention consists in a conduit-cap having certain details of construction as will be hereinafter described and pointed out in the claims.

In carrying out my invention as herein shown, I employ a domical cover 7 having a semicircular inner wall 8, a straight outer wall 9, and straight side walls 10. The said cover is formed within its semi-circular inner wall 8, with two stop-plugs 11, and within its outer corners, with two stop lugs 12. The said cover is also provided at substantially opposite points and near where its semi-circular inner wall 8 merges into its side walls 10, with threaded openings 13 for the reception of retaining-screws 14.

The frame-piece 15 of the cap conforms to the shape of the domical cover 7 thereof, within the open lower face of which it snugly fits. For the reception of the projecting inner ends of the retaining-screws 14, the lower face of the frame-piece is formed with recesses 16 having inclined bottom walls 17 upon which the threads of the inner ends of the screws 14 ride to crowd the frame-piece inward into the cover and firmly seat it upon the stop lugs 11 and 12 aforesaid. In this matter of crowding the frame-piece inward to a bearing upon the said lugs 11 and 12, the screws may be said to act flatwise rather than endwise.

The said frame-piece is formed in its outer edge with a deep rectangular recess 18 for the reception of a sectional insulator composed of corresponding parts 19 and 20 the edges of which are formed with grooves 21 to adapt them to fit over the edges 22 surrounding the recess 18. Close to the center of its semi-circular inner edge, the said frame-piece has a threaded opening 23 concentric with an integral upstanding threaded boss 24, the said opening 23 and boss 24 receiving the threaded upper end of a conduit-pipe 25. The outer edge of the boss 24 is extended to form a semi-circular shoulder 26 the upper edge 27 of which is rounded and extended inward so as to overhang the shoulder 26. The said rounded edge 27 is provided for carrying the wires and preventing their contact with any sharp edges such, for instance, as the end of the pipe 25. As shown, the semi-circular inner edge of the frame-piece 15 is formed with a shallow notch 28 forming a guide in the event of cutting away the portion 28 of the inner edge of the plate so as to intersect the opening 23 and adapt the cap to be applied to a pipe 25 after the wires have already been run through the same and connected. With the same end in view, the insulator is made in two parts 19 and 20.

By threading the retaining-screws 14 into the wall of the domical cover 7, and providing the frame-piece 15 with recesses 16 having inclined bottom walls 17, I am enabled to utilize the retaining-screws for the two-fold purpose of holding the frame-piece in place within the cover and of forcing it to a firm bearing upon the stop-lugs 11 and 12 within the same. Heretofore the frame-pieces of such caps have been tapped for the reception of the retaining-screws, while the screw-receiving holes 13 in the cover have been left unthreaded. Such construction has been found objectionable because it has necessitated, in order to remove the frame-piece, reversing the screws so as to entirely clear the threaded openings in the frame-piece after which the screws were left free to drop out, whereas in my construction the screws are retained in place after they have been sufficiently reversed to clear the edges of the frame-piece. In this respect my improved conduit-cap is not only simpler and more economical to manufacture than those of the prior art, but also far more convenient and effective in use.

I claim:—

1. In a conduit-cap for electric installation, the combination with a domical cover the wall of which is formed with threaded openings for the reception of retaining-screws, of a frame-piece adapted to fit within the said cover and formed in its lower face with recesses for the reception of the projecting inner ends of the said screws, the bottom walls of the said recesses being inclined to form bearings for the threads of the screws which act flatwise through the said inclined walls to crowd the frame-piece inward to its bearing within the cover.

2. In a conduit-cap for electric installation, the combination with a domical cover, of a frame-piece adapted to be fitted within the open lower face of the said cover and formed near its inner edge with a threaded opening for the reception of the end of a conduit-pipe, and also formed adjacent to the said opening and in its edge with a guide-notch to facilitate the cutting away of the metal of the frame-piece between said notch and opening to permit the cap to be applied to a pipe after the wires have been run through the same and connected.

In testimony whereof, I have signed this specification in the presence of two subscribing witnesses.

WHEELER H. VIBBER.

Witnesses:
 C. L. WEED,
 M. P. NICHOLS.